MICRO-IMAGE STORAGE AND RETRIEVAL APPARATUS

Filed Jan. 18, 1965 6 Sheets-Sheet 1

INVENTORS
IVAN V. RONDAS
JOHN L. JONES

BY Louis A. Kline
John J. Matlago
Dominick Nardelli
THEIR ATTORNEYS

INVENTORS
IVAN V. RONDAS
JOHN L. JONES

BY Louis A Kline
John J. Matlago
Dominick Nardelli
THEIR ATTORNEYS

MICRO-IMAGE STORAGE AND RETRIEVAL APPARATUS

Filed Jan. 18, 1965

6 Sheets-Sheet 3

INVENTORS
IVAN V. RONDAS
JOHN L. JONES

BY Louis A. Kline
John J. Matlago
Dominick Nardelli
THEIR ATTORNEYS

INVENTORS
IVAN V. RONDAS
JOHN L. JONES

BY Louis A Kline
John J. Matlago
Dominick Nardelli
THEIR ATTORNEYS

May 16, 1967 I. V. RONDAS ET AL 3,319,517

MICRO-IMAGE STORAGE AND RETRIEVAL APPARATUS

Filed Jan. 18, 1965 6 Sheets-Sheet 5

INVENTORS
IVAN V. RONDAS
JOHN L. JONES

BY Louis A Kline
John T. Matlago
Dominick Nardelli
THEIR ATTORNEYS

MICRO-IMAGE STORAGE AND RETRIEVAL APPARATUS

Filed Jan. 18, 1965

INVENTORS
IVAN V. RONDAS
JOHN L. JONES

BY Louis A Kline
John J. Matlago
Dominick Nardelli
THEIR ATTORNEYS

United States Patent Office 3,319,517

Patented May 16, 1967

3,319,517

MICRO-IMAGE STORAGE AND RETRIEVAL APPARATUS

Ivan V. Rondas, Compton, and John L. Jones, Gardena, Calif., assignors to The National Cash Register Company, Dayton, Ohio, a corporation of Maryland Filed Jan. 18, 1965, Ser. No. 426,049
9 Claims. (Cl. 88—24)

This invention relates to a micro-image storage and retrieval apparatus and, more particularly, to an apparatus which stores information in the form of micro-images on a transparent film, and has the capability of storing over 12,000 micro-images, and retrieving any one of the micro-images as required, within a few seconds.

The need for compacting information in order to save space is generally well known. In recent times with the advent of space travel, it has become apparent that large libraries are needed in a space capsule in order to secure the success of the mission. Not only must the size of the library be reduced in order to fit into the space capsule, but the weight must also be held to a minimum to be practical for such uses.

Therefore, an important object of this invention is to provide a compact, light-weight micro-image storage and retrieval apparatus having the capability of storing over 12,000 micro-images and retrieving for viewing any one of the micro-images within a few seconds.

Another object of this invention is to provide a film strip having 12,000 or more micro-images printed thereon so that the need for changing film strips in the micro-image storage and retrieval apparatus is eliminated or reduced, thereby providing rapid access to the information.

Another object of this invention is to provide a means for scanning the film strip from one end to the other which means applies and maintains a uniform tension to the film strip to keep the picture on the screen in focus as the film strip is scanned from one end to the other.

Another object of this invention is to provide a means for transversely moving the film strip relative to the optical axis of the apparatus while the film strip is under tension to provide access to the micro-images located across the film strip.

Another object of this invention is to provide a rear projection screen with a frosted glass plate with a converging lens placed thereagainst so that the screen brightness is increased and made uniform without degrading the resolution of the apparatus.

Broadly, one embodiment of the compact, light-weight information storage and retrieval apparatus includes an enclosure that is less than 12 inches long, 10 inches wide and 2¼ inches high, so that the apparatus could be held on, and also straped, if desired, to the lap of the user for accessibility. The micro-images which are, for example, one millimeter square, are placed on a film strip in rows and columns. For example, if the film strip is 35 millimeters wide, 25 micro-images could be easily placed side by side across the film strip, and the 12,000 micro-images would fit on a film strip about 2 feet long and still provide appropriate leaders at the ends of the strip. The film strip is mounted on a suitable transport means having two film spools. The ends of the film strip with the leaders are wound on respective spools so that longitudinal motion is provided to the film strip by allowing the film strip to be unwound off one spool and onto the other when the spools are rotated in unison. A projection light beam is provided to pass through the film strip as it passes from one spool to the other. The projection light beam passes through a compact optical system and projects each micro-image, in turn, on a screen. Since the compact optical system magnifies the area of the micro-images, for example, 10,000 times in order to make the micro-images readable on the screen, the projection lens in the optical system has a relatively short focal length. To insure that the film strip is held flat as it passes through the focal plane of the projection lens, the film strip is stretched over a flat transparent member as it passes through the region of the projection light beam. Thus, a focused picture is maintained on the screen as the film strip is scanned. However, the effective diameters of both spools change as the film strip is being transported from one spool to the other. Therefore, to insure that the film strip is held flat against the transparent member, one of the spools is provided with a torsion spring which maintains a tension in the film strip. The torsion spring reacts between the outside cylindrical wall and the hub of the spool to urge the cylindrical wall to rotate so as to wind the film strip on the spool. Since the film strip is being held by the other spool, tension is maintained on the film strip, and, at the same time, compensation is provided for the variations in effective spool diameters. To provide transverse motion to the film strip with respect to the projection light beam, the hubs of both spools are mounted on spline shafts so that while the shafts are rotating, the spools can be moved along the shafts. Since the tension, maintained in the film strip, forms a relatively large bearing pressure between the spline shafts and the hubs, ball bearings are suitably placed between the spline shafts and hubs to absorb the large bearing pressure and to allow the spools to roll smoothly along the shafts. The projection light beam includes a suitable optical system made of standard optical components which are combined to provide high resolution and high illumination efficiency on a frosted glass screen. A small, low energy, tungsten lamp is used to form the projection light beam. To increase the "gain" of the screen and provide a uniformly illuminated screen without degrading the picture on the screen, a relatively thin transparent plate which has the properties of converging light rays, is placed against the frosted glass screen. The transparent plate intercepts the light rays and converges them before the rays are diffused by the screen.

These and other features of the present invention will become apparent from consideration of the following description when taken in conjunction with the appended claims and the drawings wherein:

As used in this disclosure, the term "micro-image" refers to an image that has a resolution of at least 400 lines (line-pairs) per millimeter, and that has, in general, an area of one square millimeter. Resolution is a measurement of the number of equivalent line-pairs (a line-pair consists of one black line adjacent to a white line) per millimeter that are distinguishable in an image or picture. A film refers to a thin flexible transparency on which the micro-images are provided, and the film may be made of, for example, cellulose acetate. A film strip refers to, in general, a piece of film having a length substantially greater than its width, for example, a film strip may be 2 feet long and 1.4 inches (35 millimeters) wide. A picture refers to any readable information projected and visible on a screen.

Figures 1, 5:
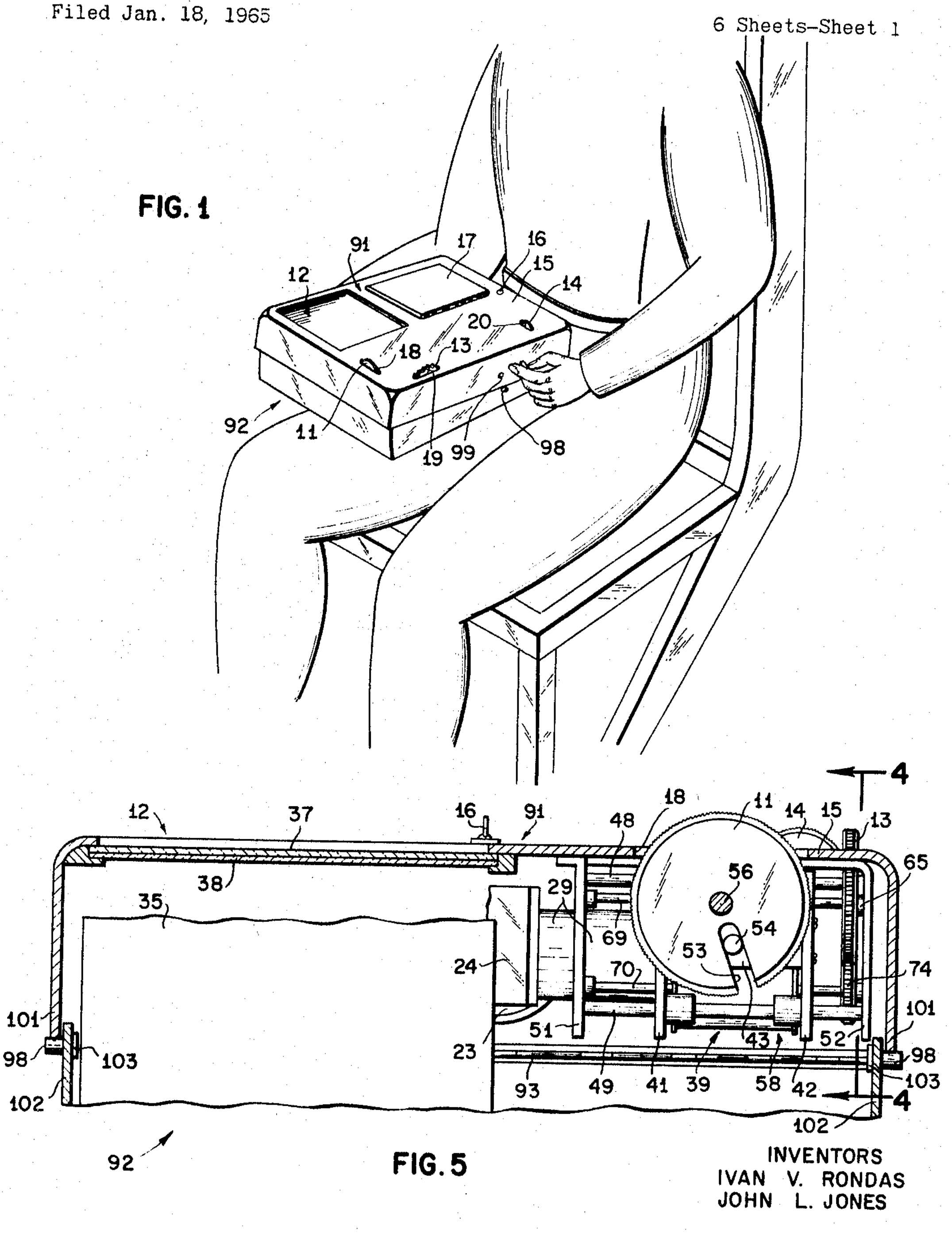
FIG. 1 shows the compact, light-weight micro-image storage and retrieval apparatus positioned on the lap of a person seated in a space capsule.
FIG. 5 is a fragment of the section of the apparatus taken on line 5—5 of FIG. 4.

Referring to FIG. 1, there is shown one embodiment of the compact, light-weight micro-image storage and retrieval apparatus employing the features of this invention. The apparatus is shown suitably strapped to the lap of a person using the apparatus so that the user could manipulate the controls for the apparatus with his left hand and write notes on a writing pad 17 with his right hand. The apparatus has a top casing 91 which fits over a lower casing 92. The top casing 91 has a top panel 15 on which the controls and writing pad 17 are mounted. The controls include an X-select control in the form of a knurled wheel 11 protruding upward through a slot 18 formed in the panel 14. When wheel 11 is rotated to the right, the pictures on a viewing screen 12 are moved left to right, and when rotated to the left the pictures are moved right to left. The screen 12 is located in the right upper corner of panel 15. A Y-select control is also included on the apparatus in the form of a toothed wheel 13 protruding upward through a slot 19 formed in the panel 15. When wheel 13 is rotated away from the user, the pictures on the screen 12 are moved away from the user to the top of the screen 12, and when rotated toward the user the pictures are moved toward the user to the bottom of the screen. The wheels 11 and 13 operate a mechanical means (to be described hereinafter) which is enclosed within the compartment formed by the top and bottom casings 91 and 92 and which, in turn, causes the pictures on the screen 12 to move across the screen at the users command. The means also maintains the pictures on the screen in focus whenever either or both wheels 11 and 13 are rotated to retrieve a particular bit of information.

Figure 2:
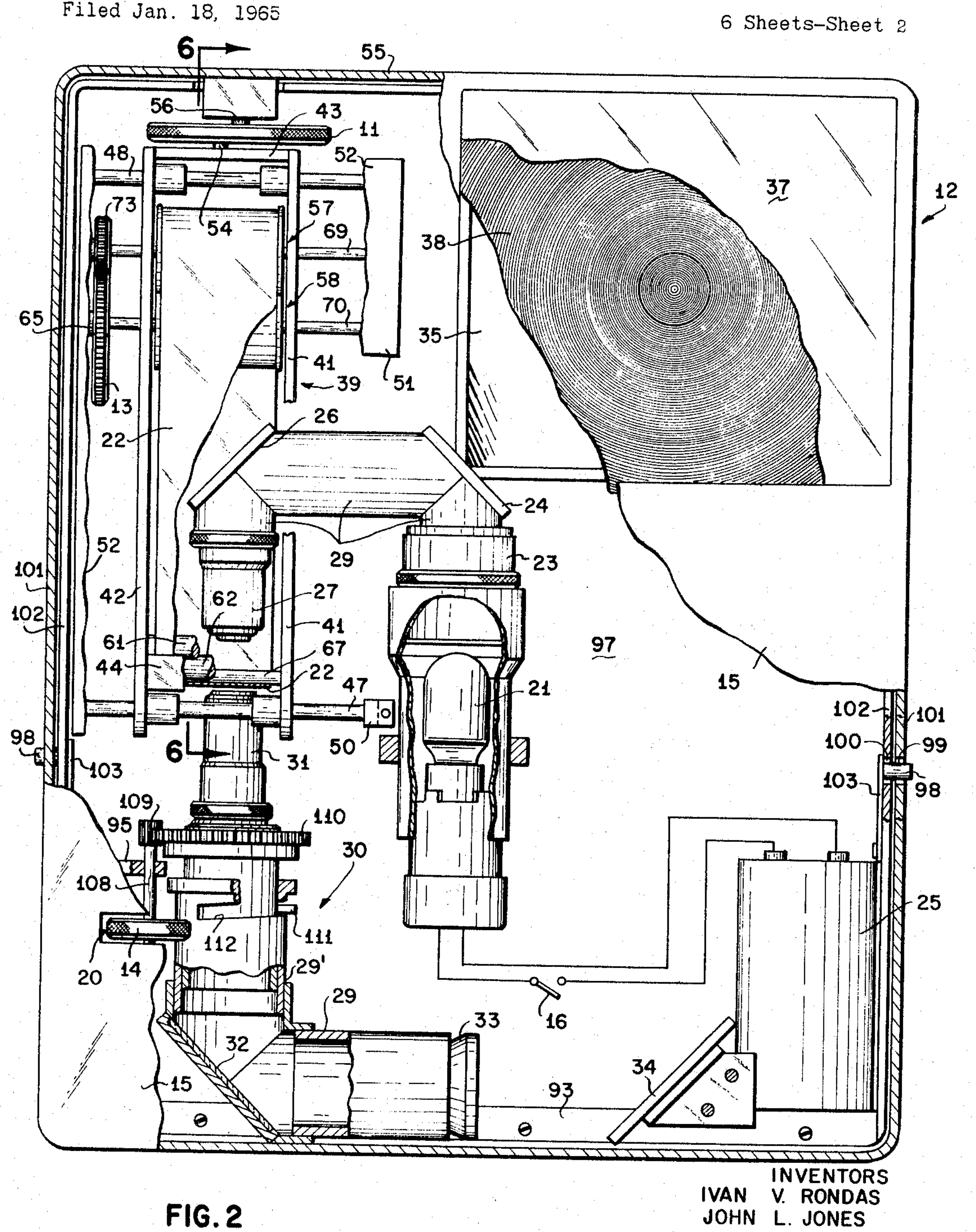
FIG. 2 is a plan view of the apparatus with a portion of the top panel removed showing the interior thereof.
Figure 9:
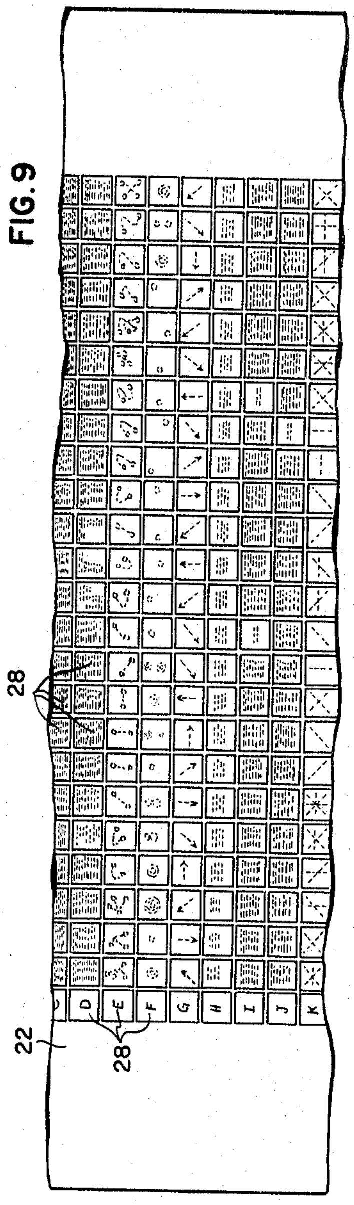
FIG. 9 is an enlarged view of a very short length of the film strip showing the relative location of the micro-images.

To initially form a focused picture on the screen 12 the apparatus also includes a focusing control in the form of a knurled wheel 14 protruding upward through a slot 20 formed in the top panel 15. Then, as the wheel 14 is rotated back and forth, the picture on the screen 12 is focused and defocused by mechanical focusing means to be described hereinafter. When a switch 16, located on the top panel 15 of the apparatus, is switched on, a projection light beam is formed and a picture is visible on the screen 12. The apparatus projects, for example, a 4 x 4 inch picture on the screen 12 obtained from any one of the micro-images 28 (FIG. 9) which are each about 1 x 1 millimeters. An enlarged illustration of the film strip 22 is shown in FIG. 9. The micro-images 28 are placed in rows and columns, for example, on the 35-millimeter film strip 22. Twenty-five columns of micro-images are placed across the film strip, and the film strip 22 is made sufficiently long so as to contain as many as 12,000 micro-images on one film strip. FIG. 9 shows only a few of the rows. Since, as will be explained hereinafter, the film strip 22 is wound on suitable spools 57 and 58 (as shown in FIG. 2), more than 12,000 micro-images can readily be accommodated by the apparatus without departing from the scope of this invention. To simplify the searching operation of the film strip for information, the micro-images 28, which are in the first column and are marked, D, E, F, etc. (FIG. 9), could contain titles or data to indicate what information is stored by that particular row.

Figure 3:
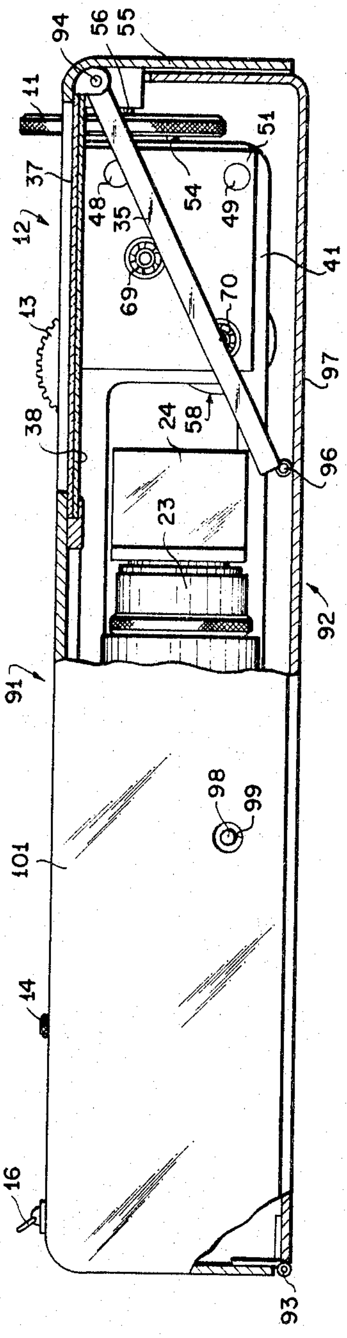
FIG. 3 is a right side view of the apparatus in its folded position with portions of the right side panels removed.
Figure 4:
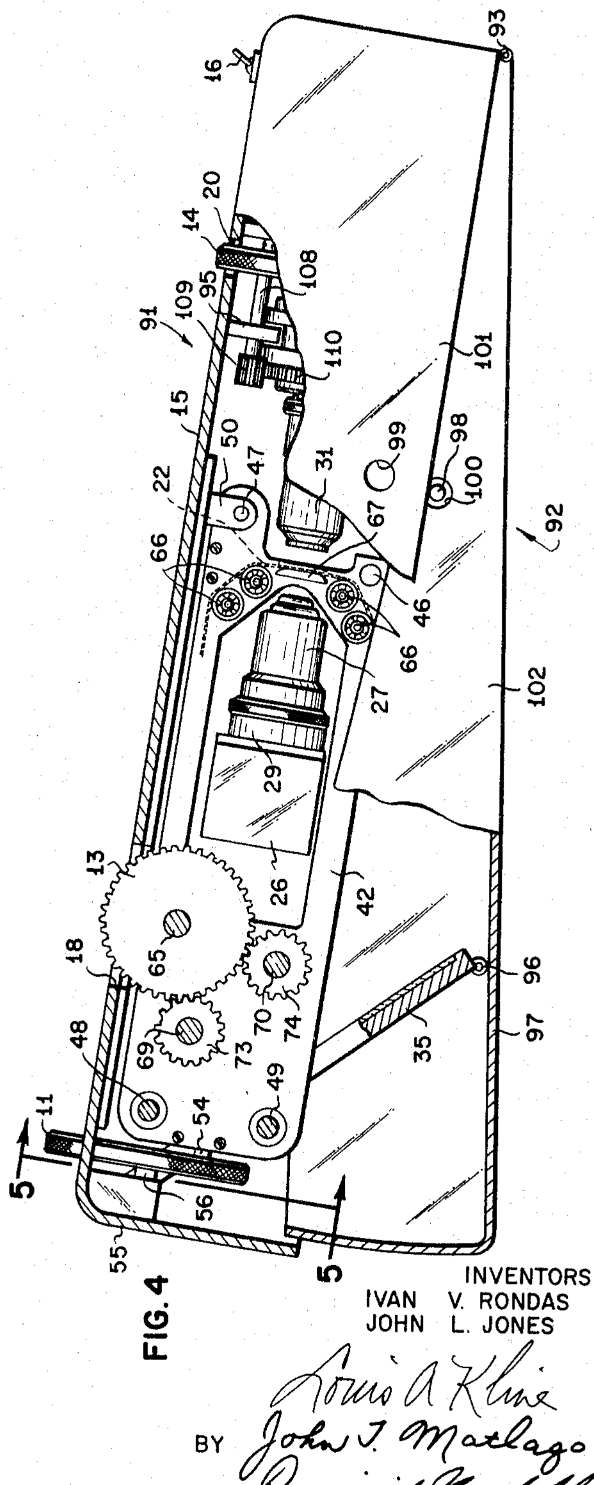
FIG. 4 is a left side view of the apparatus in its unfolded position ready for use with portions of the left side panels removed.

Since the picture on the screen 12 is about 4 x 4 inches, this means that the cross-section of the projection beam at the screen should also be this size. However, since one of the requirements of the apparatus is that it should be of small size, the apparatus is made so that the bottom casing 92 and top casing 91 are connected by a hinge 93 (FIG. 3) such that the top casing can swing down to fit over bottom casing 92 to make a package less than 2¼ inches high for storage. Referring to FIGS. 3 and 4, the apparatus is shown in its storage and in-use positions, respectively. The depth of the apparatus is increased by raising the top casing 91 above the lower casing 92. The hinge 93, placed along one side of the apparatus facilitates this operation. When the top casing 91 is raised, a mirror 35 (whose function will be explained hereinafter) pivots downward about a pin 94 (FIG. 3) so that the mirror is at the correct angle to properly reflect the projection beam onto the rear of the screen 12. The lower end of the mirror 35 has rollers 96 to facilitate motion between the mirror 35 and a bottom panel 97 of the bottom casing 92 when the apparatus is placed into the in-use position and back again to the storage position. The apparatus is readily locked in the storage position by pins 98 protruding through suitable bores 99 and 100 (FIG. 4) formed in side panels 101 and 102 of the top and bottom casings 91 and 92, respectively. The pins 98 are fixed to the side panels 102 of the bottom casing by a leaf-spring 103 (FIG. 2) fixed to the inside of the panels 102, as shown. The leaf-spring 103 allows the user to push the pins 98 into the apparatus when he wishes to use the apparatus. When the pins 98 are pushed sufficiently into the apparatus, the side panels 101 of the top casing 91 are free of the pins 98 and the top casing 91 may be raised. The pins 98 are so located that when the side panels 101 of the top casing 91 rest on the pins, as shown in FIG. 4, the top and bottom casings 91 and 92 are in the correct position respective to each other so that the mirror 35 reflects the projection beam onto the rear of the screen 12.

Referring to FIG. 2, there is shown the internal arrangement of the optical system of the apparatus, the mechaincal means for searching the film strip, and the focusing means, mentioned above. The optical system includes a light condensing system which condenses the light rays produced by a tungsten lamp 21 onto a portion of the film strip 22. The lamp 21 consumes, for example, 5 watts of electric power which is supplied by a battery 25, making the apparatus self-operating. Switch 16 is schematically shown in FIG. 2 and, when closed, causes the lamp 21 to light up. Within the optical path from the lamp 21 to the film strip 22 there are included a light collecting lens 23, two folding mirrors 24 and 26, and a condensing lens 27 to produce a bright spot of light of sufficient area to illuminate one of the micro-images 28 on the film strip 22. The film strip, being a transparency, allows the light rays to pass therethrough so that the rays now contain the information on the film strip 22. The information contained within the light rays is focused on the screen 12 by a projection lens system 30 which includes a high numerical aperture objective lens 31, a folding mirror 32, and an eye-piece lens 33. In this embodiment the objective lens 31 and eye-piece lens 33 are obtained from commercially available microscopes having the required optical characteristics that will make the micro-images readable on the screen 12. The light rays from the lamp 21 to the condensing lens 27 and from the objective lens 31 to the eye-piece lens 33 are contained within suitable tubes 29 and 29' to prevent extraneous light rays from straying and interfering with the resolution and contrast of the system.

The light rays, after passing through the projection lens system 30, are reflected by folding mirrors 34 and 35 (more clearly shown in FIG. 10) so that as mentioned above, the rays are projected upwardly onto the rear of the screen 12. The screen 12 includes a frosted glass plate 37 of the type normally used for high gain, rear projection screens. To further increases the gain of the screen and also produce a screen that appears to have a uniform luminance to the user, a converging lens 38 is placed next to the frosted glass plate 37 to intercept and converge the light rays in the projection light beam before the rays are diffused by the frosted plate 37. The characteristics of the lens 38 that produces a screen with a uniform luminance to the user will be explained hereinafter.

Figure 8:
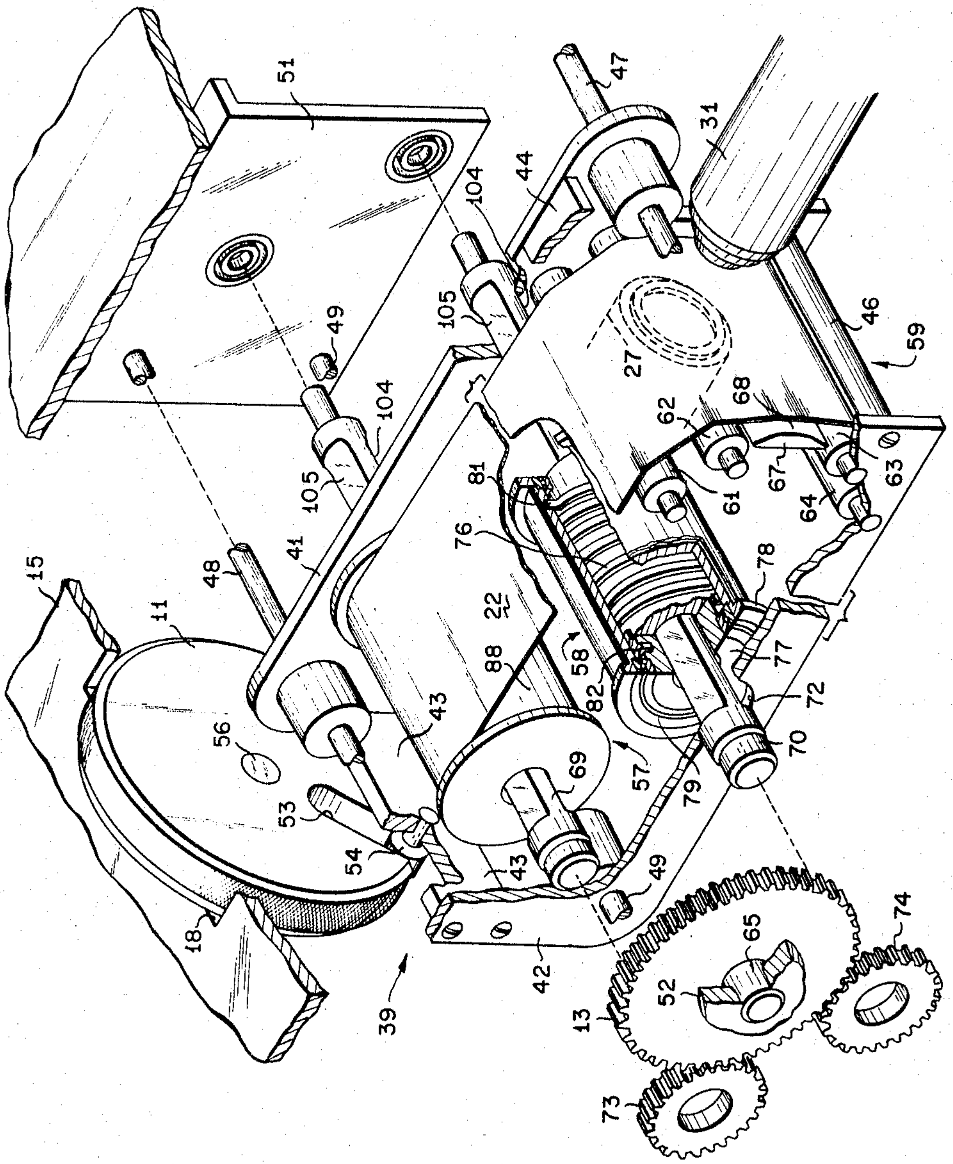
FIG. 8 is an exploded pictorial view of the film transport means and proximate structure.

Having described the optical system of the apparatus, the following is a description of the mechanical means, mentioned above, which allows the user to search through the 12,000 or more micro-images 28 on the film strip 22 in a matter of seconds and retrieve the desired micro-image so that the optical system may display the information thereon on the screen 12. Referring to FIGS. 2 and 8, wherein a film transport means 39 is shown in plan view and in pictorial view, respectively, the film transport means 39 has two spaced side plates 41 and 42 that are braced together at both ends by bracket bars 43 and 44 (more clearly shown in FIG. 8). The film transport means is further braced by an additional member in the form of a rod 46, disposed below bracket bar 44. The side plates 41 and 42 of the transport means 39 are disposed to slide transversely within the apparatus on three rods 47, 48 and 49. Rods 48 and 49 that are disposed above and below bracket bar 43, are suitably fixed to brackets 51 and 52 (more clearly shown in FIG. 5), that are in turn fixed to an depending from the underside of the top panel 15. Rod 47 is fixed to bracket 52 (FIG. 2) at the left end and to lug 50 (FIG. 4) on the right end. The knurled wheel 11, which is the X-select control, is linked to the transport means 39 by a radially disposed slot 53 (FIG. 8), formed thereon, engaging a pin 54 protruding from the bracket bar 43. Thus, as the wheel 11 is rotated about a pin 56 suitably fixed to the top panel 15 and back panel 55 (as shown in FIG. 4), the film transport means 39 is moved transversely either left or right.

Figures 6, 7:
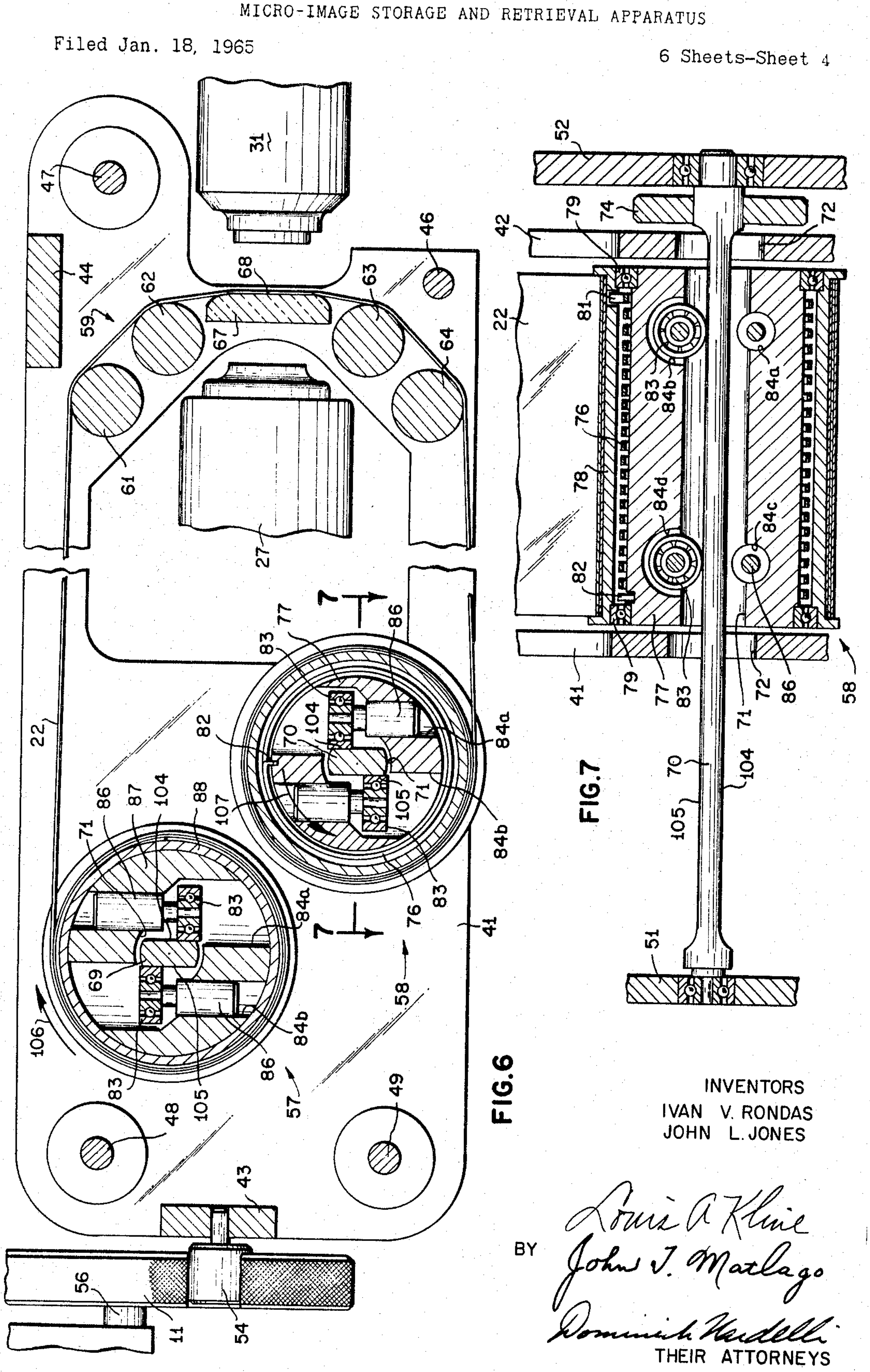
FIG. 6 is an enlarged section taken on line 6—6 of FIG. 2.
FIG. 7 is a section of the spool with the torsion spring taken on line 7—7 of FIG. 6.

Referring to FIGS. 6 and 8, the following describes how the pictures are moved up and down the screen 12 whenever the wheel 13 is rotated. Both ends of the film strip 22 are wound on spools 57 and 58, respectively, forming a loop 59 (FIG. 8) in the film strip between the spools. The spools are disposed between the two spaced side plates 41 and 42 of the film transport means 39. The portion of the film strip formed into the loop 59 passes between the condensing lens 27 and the objective lens 31. Two guide rollers 61 and 62 are provided above the condensing lens 27 and two guide rollers 63 and 64 are provided below the lens 27 to support the film strip 22 in the looped position. The four rollers 61–64 are bearing mounted to both side plates 41 and 42 by suitable bearings 66 (four are shown in FIG. 4). When tension is applied to the film strip 22 by means to be described hereinafter, a clear plastic plate 67 disposed between the condensing lens 27 and the objective lens 31, as shown in FIG. 8, holds the film strip in the focal plane of the objective lens 31. The plastic plate 67 is fixed at opposite ends to side plates 41 and 42 and has a flat surface 68 facing the objective lens 31. The surface 68 is sufficiently wide so that the particular one of the micro-images 28 displayed on the screen 12 lies in the focal plane of the objective lens 31.

The spools 57 and 58, that are disposed between side plates 41 and 42, are mounted on spline shafts 69 and 70, respectively, so that the spools may rotate with the respective spline shafts 69 and 70 and are also able to move axially along the shafts in a manner to be described hereinafter. The spline shafts 69 and 70 pass freely through oversized bores formed in both side plates 41 and 42, for example, as shaft 70 passes through bores 72 (shown in FIG. 7). Both spline shafts are bearing mounted at each end to the brackets 51 and 52 in the same manner as shown for spline shaft 70. At one end of both spline shafts 69 and 70 there are disposed gears 73 and 74 (FIG. 4), respectively, which mesh with the toothed wheel 13. The gears 73 and 74 are press fitted on the respective shafts 69 and 70 so that the shafts rotate with the gears. The toothed wheel 13 is disposed to rotate about a pin 65 fixed to bracket 52 as shown in FIG. 2. Then when the wheel 13 is rotated by the user, the wheel 13 rotates one of the shafts in a direction so that the spool mounted thereon takes up the film strip 22 at the same time that the other shaft is rotated by the wheel in the other direction so that the other spool unwinds the film strip 22. In the preferred embodiment, the gears 73 and 74 have the same number of teeth so that while one of the spools makes one revolution to unwind the film strip, the other spool makes one revolution to wind the film strip. It should be noted that the effective diameters of the spools vary as the film strip moves from one spool to the other. The means (mentioned above) for applying tension to the film strip also compensates for the changing effective diameter of the spools. Referring to FIGS. 7 and 8, the means for applying tension to the film strip 22 is included within the spool 58 in the form of a coil torsion spring 76 disposed between a hub 77 and a cylindrical wall 78. The cylindrical wall 78 is coaxially disposed around the hub 77 with suitable bearings 79 provided therebetween so that the wall 78 can rotate with respect to the hub 77. The coil spring 76 has an outwardly protruding finger 81 which is disposed within a suitable bore formed in the cylindrical wall 78. An inwardly protruding finger 82, formed at the other end of the coil spring 76, is disposed within a suitable bore formed in the hub 77. The coil spring 76 is so wound to cause the cylindrical wall 78 to be urged by the spring to rotate about the hub 77 in the direction whereby the wall 78 pulls on the film strip 22. Since the other end of the film strip 22 is wound on the spool 57, which cannot rotate unless the hub 77 of the spool 58 also rotates, a tension is applied to and maintained on the film strip 22. It is understood that the spool 57 cannot rotate without spool 58 rotating since the hubs of both spools are coupled to the wheel 13 by gears 73 and 74. Thus, when wheel 13 is rotated by the user, both spools rotate and the film strip 22 winds off one spool and onto the other while tension is maintained in the film strip. It should be noted that this feature enables the force required by the user to rotate the wheel 13 to be relatively constant irrespective of the position of the film strip 22 on the spools.

As mentioned above, the film transport means 39 including the spools 57 and 58 is able to move transversely left to right across the apparatus when the knurled wheel 11 is rotated by the user. The spools 57 and 58 move freely along their respective spline shafts 69 and 70 without rotating with respect to the spline shafts. Referring to FIGS. 6 and 7, the structure which allows the spools to move freely along the spline shafts is shown in detail. For example, one spline shaft 70 is machined from a round stock made of steel so that it has two parallel surfaces 104 and 105. The shaft 70 is freely disposed in a cylindrical bore 71 formed in the hub 77 of spool 58. The hub 77 also has four bores **84*a*, 84*b*, 84*c* and 84*d* disposed normal to a plane passing through the axis of bore 71. The bores 84*a* and 84*b* are disposed opposite each other with the shaft 70 lying therebetween. Bores 84*c* and 84*d* are also disposed opposite each other. Each bore 84*a*, 84*b*, 84*c* and 84*d* encloses a bearing similar to the bearing 83 shown within bores 84*a* and 84*b* (FIG. 6). The bearings 83 are disposed within the larger diameter portion of the bores and are mounted on bearing shafts 86. The bearing shafts 86 are press fitted into the smaller diameter portion of the bores, as shown in FIG. 6. The outer race of each of the bearings 83 rides on the respective surfaces 104 and 105 of the spline shaft 70. Since the spring 76 exerts a force on the hub 77 in the direction of arrow 107 (FIG. 6), the outer race of each of the bearings 83 in spool 58 is continuously urged against the respective flat surface 104 or 105 on the spline shaft 70. Thus, smooth axial motion is provided between spool 58 and shaft 70. The spool 57 is made substantially the same as spool 58 except that the spool 57 has an outer cylindrical wall 88 press fitted onto a hub 87 with the bearings 83 enclosed therein. Only two bores 84***a* and 84*b*, with bearing 83, are shown in spool 57 in FIG. 6, but spool 57 includes two more bores with bearings to provide stability between the spool and the spline shaft. The respective bearings 83 in spool 57 ride on surfaces 104 and 105 of spline shaft 69. Therefore, the spool 57 like spool 58 is able to move freely on the spline shaft, even though the film strip 22 exerts a force on the spool 57 in the direction of arrow 106.

Having described the mechanical means which aids the user in rapidly performing a search, the following is a description of the focusing means, mentioned before, for the apparatus. Referring to FIG. 2, since the apparatus is compact and is able to produce enlargements having an area increase of about 10,000 times their original size, the objective lens 31 has a small depth of focus whereby various unknown causes would affect the focus of the picture on the screen. Therefore, the function of the knurled wheel 14 is to focus the picture on the screen 12. This result is accomplished by rotating wheel 14 which, in turn, rotates a shaft 108. The shaft 108 is bearing mounted to the underside of the top panel 15 by a lug 95 (as shown in FIG. 4). The other end of the shaft 108 has a pinion gear 109 which meshes with a ring gear 110 placed concentrically on the objective lens 31. When wheel 14 is rotated, the objective lens 31 is also rotated within the respective tube 29'. The objective lens 31 also moves axially with respect to the tube 29' because a radially disposed pin 111, fixed to the objective lens rides within a helical slot 112 formed in tube 29'. Thus, as the wheel 14 is rotated, the objective lens 31 is moved closer to or farther from the plastic plate 67 which holds the micro-images in a flat plane.

Figures 10, 11:
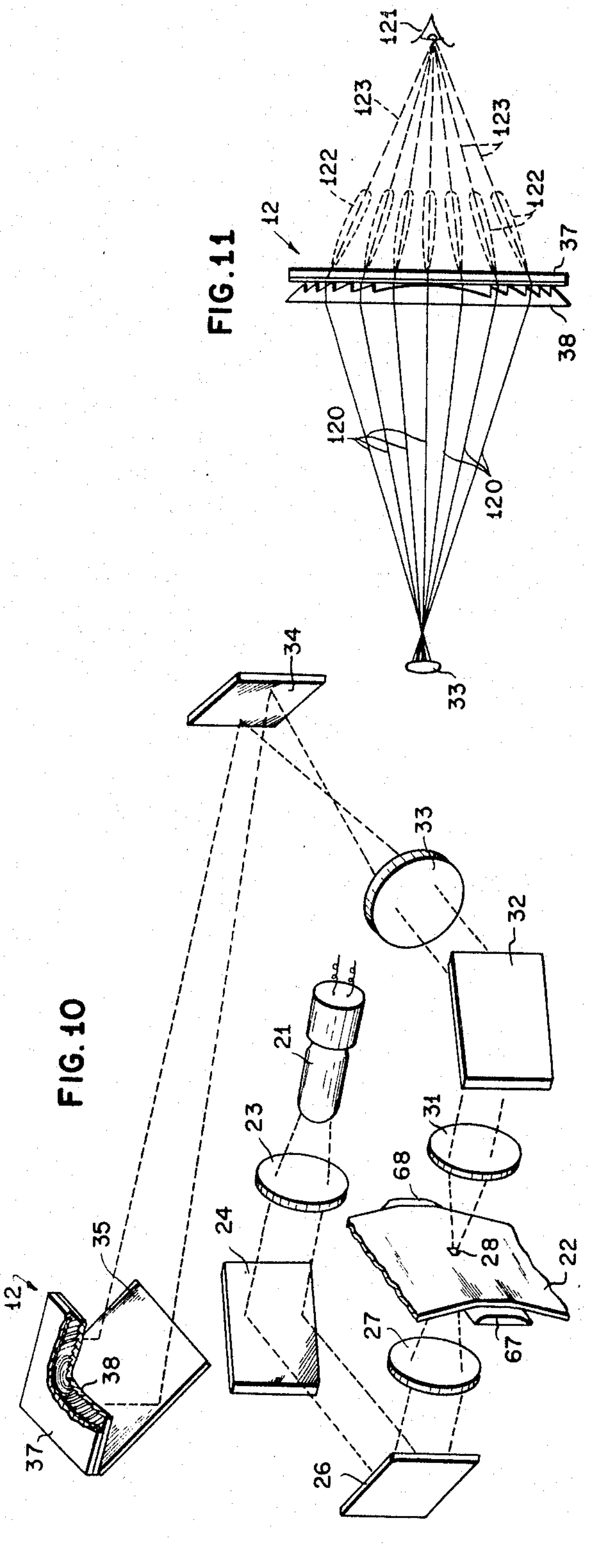
FIG. 10 is a pictorial view showing the optical elements of the apparatus in schematic form.
FIG. 11 is a schematic diagram showing how the converging lens next to the viewing screen functions to produce a more evenly illuminated screen.

Referring to FIG. 11, the following description explains very broadly how the converging lens 38 makes the screen 12 appear to be uniformly illuminated to the user. As mentioned before, one feature of the apparatus is its compactness and being able to magnify the area of an image 10,000 times. The diverging light rays represented schematically by solid lines 120 after leaving the eye-piece lens 33 form a relatively large solid angle so that the required magnification is obtained within the space limitations. The converging lens 38 has the characteristic of being able to redirect the diverging rays 120 so that they converge to a point, for example, 10 inches away from the screen 12 where the user's eye 121 is normally located. In order to preserve the resolution of the system and to prevent distortion in the picture on the screen, it is desirable to place the frosted glass 37 as near to the principal planes of the lens 38 as possible. Thus, lens 38 is a stepped lens, that is, it has concentric circular steps formed in one surface as shown in FIG. 11. The concentric steps are so arranged to produce the characteristic of a very thick lens in a transparent plate of 1/16 of an inch thick. A transparent plate such as lens 38 is generally called a Fresnel lens in the art. The now converging light ray will be diffused by the frosted glass 37. The property of the frosted glass 37, that causes each light ray 120 to scatter and be contained within a solid angle, is well known. The majority of the energy in the light ray is directed along the line of the light ray. However, lesser amounts of energy are directed along lines making an angle with the line of the light ray. If the magnitude of the scattered light energy within the solid angle is represented by vectors, the heads of the vectors form an envelope which is called the visual energy lobe for the light ray. The visual energy lobes for the light rays 120 are represented by the short dash lines 122. The long dash lines 123 representing the rays entering the user's eye 121 pass through the lobes 122 where the energy is maximum. Thus, the screen 12 appears brighter and uniformly illuminated to the user. The schematic representation of the converging lens in FIGS. 10 and 11 is greatly exaggerated for clarity. However, the concentric rings forming the steps in the lens 38 as used in the apparatus are, for example, 100 rings to the inch.

Various other modifications and variations of the present invention are contemplated and will become apparent to those skilled in the art without departing from the spirit and scope of the invention. Therefore, the invention is not limited to the exemplary apparatus or procedures described, but includes all embodiments within the scope of the claims.

What is claimed is:

1. A micro-image storage and retrieval apparatus comprising: a film strip having micro-images printed in rows and columns thereon; means for producing a projection light beam; a screen placed in the path of said projection light beam for displaying an enlarged picture of one of said micro-images on said film strip; a film transport means for supporting said film strip in the path of said beam to cause said beam to pass through the film strip; said film transport means including: two spools on which the ends of said film strip are wound; a frame for supporting said spools in rotating relation therewith; means for moving said frame and film strip across said projection light beam to cause said projection light beam to move transversely across said film strip; two spline shafts on which said spools are respectively mounted and disposed to rotate with and to move axially along the respective shafts; means for mounting both of said spline shafts in rotating relation within said apparatus; gear means for coupling said two shafts together to cause one of the shafts to rotate in a direction to unwind said film strip therefrom at the same time the other shaft is rotated in a direction to wind the film strip thereon; and spring means disposed in at least one of said spools for maintaining a tension on said film strip.

2. A micro-image storage and retrieval apparatus comprising: a film strip having micro-images printed in rows and columns thereon; means for producing a projection light beam; a screen placed in the path of said projection light beam for displaying an enlarged picture of one of said micro-images on said film strip; a film transport means for supporting said film strip in the path of said beam to cause said beam to pass through the film strip, said film transport means including: two spools on which the ends of said film strip are wound; a frame for supporting said spools in rotating relation therewith; means for moving said frame and film strip across said projection light beam to cause the next micro-image in the row to be displayed on said screen; two spline shafts on which said spools are respectively mounted and disposed to rotate with and to move axially along the respective shafts; means for mounting both of said spline shafts in rotating relation within said apparatus; gear means for coupling said two shafts together to cause one of the shafts to rotate in a direction to unwind said film strip therefrom at the same time the other shaft is rotated in a direction to wind the film strip thereon to cause the next micro-image in the column to be displayed on the screen; at least one of said spools including a hub engaging one of said shafts and a cylindrical wall mounted coaxially around said hub in rotating relation therewith; and a coil torsion spring disposed between said hub and said wall to urge said wall to rotate with respect to said hub to place the film strip under tension.

3. A micro-image storage and retrieval apparatus comprising: a film strip having micro-images printed in rows and columns thereon; means for producing a projection light beam; a screen placed in the path of said projection light beam for displaying an enlarged picture of one of said micro-images on said film strip; a film transport means for supporting said film strip in the path of said beam to cause said beam to pass through the film strip, said film transport means including: two spools on which the ends of said film strip are wound; a frame for supporting said spools in rotating relation therewith; means for moving said frame and said film strip across said projection light beam to cause the next micro-image in the row to be displayed on said screen; two spline shafts on which said spools are respectively mounted and disposed to rotate with and to move axially along the respective shafts; means for mounting both of said spline shafts in rotating relation within said apparatus; a pinion gear keyed to each shaft; a second gear mounted in rotating relation within said apparatus and engaging both of said pinion gears to cause said gears to rotate in opposite directions as said second gear is rotated so that the film strip is unwound off one spool and wound onto the other spool to cause the next picture in the column to be displayed on the screen; at least one of said spools including a hub through which one of said shafts extends and a cylindrical wall mounted coaxially around said hub in rotating relation therewith; a coil torsion spring disposed between said hub and said wall to urge said wall to rotate with respect to said hub to place the film strip under tension; and bearing means disposed between each spool and spline shaft to provide smooth axial motion therebetween.

4. A micro-image storage and retrieval apparatus comprising: a film strip having micro-images printed in rows and columns thereon; means for producing a projection light beam; a screen placed in the path of said projection light beam for displaying an enlarged picture of one of said micro-images on said film strip; a film transport means for supporting said film strip in the path of said beam to cause said beam to pass through the film strip, said film transport means including: two side plates disposed parallel to each other and braced together to form a rigid frame; at least one guide rod fixed to said apparatus and passing through both of said side plates in journaled relation with the plates to cause said plates to move with respect to said apparatus and have the next micro-image in the row displayed on said screen; means for controlling the position of the side plates with respect to the apparatus; two spools disposed between said side plates and with the ends of the film strip wound on the respective spools; two spline shafts passing freely through both of said side plates and respectively passing through axially disposed bores in said spools; said spools each having at least one pair of transversely disposed bores disposed on opposite sides of and communicating with the axially disposed bore in the respective spool; a ball bearing having an inner and an outer circular race disposed within each of said transverse bores with the outer race spaced from the wall of the transverse bore; means for mounting both of said spline shafts in rotating relation within said apparatus; gear means for coupling said two shafts together to cause one of the shafts to rotate in a direction to unwind said film strip therefrom at the same time the other shaft is rotated in a direction to wind the film strip thereon to cause the next micro-image in the column to be displayed on the screen; at least one of said spools including a hub through which one of said shafts extends and including a cylindrical wall mounted coaxially around said hub in rotating relation therewith; a coil torsion spring disposed between said hub and said wall to urge said wall to rotate with respect to said hub to place the film strip under tension; a transparent member having a flat surface fixed between said side plates and disposed to hold the stretched film strip flat within the region of said beam; and said ball bearings being also disposed to ride on the respective spline shafts when said film strip is under tension to provide smooth axial motion between the spools and the respective shafts.

5. A micro-image storage and retrieval apparatus for storing micro-images printed in rows and columns on a film strip, said apparatus comprising: means for producing a projection light beam; a rear projection screen placed in the path of said projection light beam for displaying an enlarged picture of one of said micro-images; means disposed adjacent said screen for intercepting said projection light beam and for converging the light rays in said beam before the rays are diffused by said screen; a film transport means for supporting said film strip within the path of said beam to cause said beam to pass through the film strip, said film transport means including: two spools on which the ends of said film strip are wound; a frame for supporting said spools in rotating relation therewith; means for moving said frame and film strip across said projection light beam to cause said projection light beam to move transversely across said film strip; two spline shafts on which said spools are respectively mounted and disposed to rotate with and to move axially along the respective shafts; means for mounting both of said spline shafts in rotating relation within said apparatus; gear means for coupling said two shafts together to cause one of the shafts to rotate in a direction to unwind said film strip therefrom at the same time the other shaft is rotated in a direction to wind the film strip thereon; and spring means in at least one of said spools for maintaining a tension on said film strip.

6. A micro-image storage and retrieval apparatus comprising: a film strip having micro-images printed in rows and columns thereon; means for producing a projection light beam; a rear projection screen placed in the path of said projection light beam for displaying an enlarged picture of one of said micro-images; means disposed adjacent said screen for intercepting said projection light beam and for converging the light rays in said beam before the rays are diffused by said screen; a film transport means for supporting said film strip in the path of said beam to cause said beam to pass through the film strip; said film transport means including: two side plates disposed parallel to each other and braced together to form a rigid frame; at least one guide rod fixed to said apparatus and passing through both of said side plates in journaled relation with the plates to cause said plates to move with respect to said apparatus and have the next micro-image in the row displayed on said screen; means for controlling the position of the side plates with respect to the apparatus; two spools disposed between said side plates with the ends of the film strip wound on the respective spools; two spline shafts passing freely through both of said side plates and respectively passing through axially disposed bores in said spools; said spools having at least one pair of transversely disposed bores disposed on opposite sides of and communicating with the axially disposed bore in the respective spool; a ball bearing having an inner and an outer circular race disposed within each of said transverse bores with said outer race spaced from the wall of the transverse bore; means for mounting both of said spline shafts in rotating relation within said apparatus; gear means for coupling said two shafts together to cause one of the shafts to rotate in a direction to unwind said film strip therefrom at the same time the other shaft is rotated in a direction to wind the film strip thereon to cause the next micro-image in the column to be displayed on the screen; at least one of said spools including a hub through which one of said shafts extends and a cylindrical wall mounted coaxially around said hub in rotating relation therewith; a coil torsion spring disposed between said hub and said wall to urge said wall to rotate with respect to said hub to place the film strip under tension; a transparent member having a flat surface fixed between said side plates and disposed to hold the stretched film strip flat within the region of said beam; and said ball bearings being also disposed to ride on the respective spline shafts when said film strip is under tension to provide smooth axial motion between the spools and the respective shafts.

7. A micro-image storage and retrieval apparatus for storing micro-images printed on a film strip, said apparatus comprising: a top casing having a top plate; a bottom casing hinged on one side to said top casing and cooperating with said top casing to form an enclosure; means disposed within said enclosure in fixed relationship to the top plate for producing a projection light beam along an optical axis substantially parallel to said top plate; a rear projection screen disposed in said top plate opposite the side to which said top and bottom casings are hinged to allow the depth of the enclosure at said screen to be changed; a film transport means for supporting said film strip in the path of said beam to cause said beam to pass through the film strip; and a mirror disposed within said enclosure and hinged to said top plate to allow said mirror to pivot away from said top plate when said top casing is lifted off said bottom casing to place said mirror in a position to reflect said beam onto the rear surface of said screen.

8. A micro-image storage and retrieval apparatus for storing micro-images printed on a film strip, said apparatus comprising: a top casing having a top plate; a bottom casing hinged on one side to said top casing and cooperating with said top casing to form an enclosure; means disposed within said enclosure for producing a projection light beam along an optical axis substantially parallel to said top plate; a rear projection screen disposed in said top plate opposite the side that said top and bottom casings are hinged to allow the depth of the enclosure at said screen to be changed; a film transport means for supporting said film strip in the path of said beam to cause said beam to pass through the film strip, said film transport means including means for moving the film lengthwise past the projection light beam for displaying successive images in a column on the film strip, and means for moving the film transversely past the projection light beam for displaying successively images in a lateral row on the film strip; and a mirror disposed within said enclosure and hinged to said top plate to allow said mirror to pivot away from said top plate when said top casing is lifted off said bottom casing to place said mirror in a position to reflect said beam onto the rear surface of said screen.

9. A micro-image storage and retrieval apparatus for reading micro-images provided on a film comprising: means for producing a projection light beam; a screen placed in the path of said projection light beam for displaying an enlarged picture of one of said micro-images on said film strip, a film transport means for supporting said film strip in the path of said beam to cause said beam to pass through the film strip, said film transport means including means for moving the film strip lengthwise past the projection light beam for displaying successive images in a column on the film strip, means for moving the film transversely past the projection light beam for displaying successive images in a lateral row on the film strip, and a transparent plate disposed adjacent said screen to intercept the light rays in said projection light beam before the rays are diffused by said screen, said transparent plate having a surface formed of a plurality of concentric circular steps to converge the light rays in said beam.

References Cited by the Examiner

UNITED STATES PATENTS

| | | | |
|---|---|---|---|
| 2,260,228 | 10/1941 | Moller et al. | |
| 2,404,448 | 7/1946 | Martin. | |
| 2,624,231 | 1/1953 | Kingston | 88—24 |
| 2,634,652 | 4/1953 | Barth | 88—24 |
| 2,914,997 | 12/1959 | Grey | 95—42 |
| 3,023,668 | 6/1962 | Allen et al. | 88—24 |
| 3,072,013 | 1/1963 | Pratt | 88—24 |
| 3,262,357 | 7/1966 | Warzynski et al. | 352—123 X |

NORTON ANSHER, *Primary Examiner.*

V. A. SMITH, R. A. WINTERCORN, *Assistant Examiners.*